(12) United States Patent
Wu et al.

(10) Patent No.: US 8,280,370 B2
(45) Date of Patent: Oct. 2, 2012

(54) METHOD AND DEVICE FOR DETECTING NEIGHBORING BS INTERFERENCE INTERFERENTIAL NEIGHBORING BS

(75) Inventors: Xuyong Wu, Shenzhen (CN); Zhong Pan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 676 days.

(21) Appl. No.: 12/416,742

(22) Filed: Apr. 1, 2009

(65) Prior Publication Data

US 2009/0186609 A1 Jul. 23, 2009

Related U.S. Application Data

(63) Continuation of application No. PCT/CN2007/071010, filed on Nov. 2, 2007.

(30) Foreign Application Priority Data

Nov. 3, 2006 (CN) .......................... 2006 1 0143860

(51) Int. Cl.
*H04W 24/00* (2009.01)
(52) U.S. Cl. ......... 455/424; 455/423; 455/425; 455/501
(58) Field of Classification Search .......... 455/423–425, 455/501
See application file for complete search history.

(56) References Cited

U.S. PATENT DOCUMENTS

| 5,606,729 | A | 2/1997 | D'Amico et al. |
| 6,195,327 | B1 | 2/2001 | Lysejko et al. |
| 2001/0034238 | A1 | 10/2001 | Voyer |
| 2002/0188723 | A1* | 12/2002 | Choi et al. ..................... 709/225 |
| 2004/0081121 | A1* | 4/2004 | Xu ................................. 370/329 |
| 2004/0166887 | A1 | 8/2004 | Laroia et al. |
| 2005/0054294 | A1* | 3/2005 | Khun-Jush et al. .......... 455/63.1 |
| 2008/0259811 | A1* | 10/2008 | Cordeiro et al. .............. 370/252 |

FOREIGN PATENT DOCUMENTS

| CN | 1188574 | 7/1998 |
| CN | 1322100 | 11/2001 |

(Continued)

OTHER PUBLICATIONS

First Chinese Office Action dated (mailed) Jun. 23, 2010, issued in related Chinese Application No. 200610143860.6, Huawei Technologies Co., Ltd.

(Continued)

*Primary Examiner* — Jinsong Hu
*Assistant Examiner* — Michael Nguyen
(74) *Attorney, Agent, or Firm* — Finnegan, Henderson, Farabow, Garrett & Dunner LLP

(57) ABSTRACT

A method for detecting a neighboring BS interference is provided. The method includes the following steps. A base station (BS) informs a coexistence signaling interval information to a subscriber station (SS) in a wireless access system. The SS obtains a silent period in a coexistence signaling interval from the coexistence signaling interval information, and monitors an interference information from a neighboring BS during the silent period. The SS reports the monitored interference information to the BS. A device for detecting a neighboring BS interference, a method for identifying an interferential neighboring BS and a device thereof are further provided. The problem of resource conflict raised when two BSs which originally are not neighboring BSs become neighboring BSs because of changes of a SS's status, or SS's position and environmental conditions, is solved.

35 Claims, 10 Drawing Sheets

FOREIGN PATENT DOCUMENTS

| CN | 1706141 | 12/2005 |
|---|---|---|
| CN | 1706141 A | 12/2005 |
| CN | 1778058 | 5/2006 |

OTHER PUBLICATIONS

Written Opinion of the International Searching Authority (translation) dated (mailed) Jan. 31, 2008, issued in related Application No. PCT/CN2007/071010, filed Nov. 2, 2006, Huawei Technologies Co., Ltd.

IEEE; Call for Comments and Contributions: IEEE 802.16 License-Exempt Task Group; Dec. 15, 2005, 1 pg. IEEE 802.16h-05/028.

IEEE WirelessMan 802.16; Third Working Group Review: P802.16h Working Document; IEEE 802.16 License-Exempt Task Group; Aug. 10, 2006, 1 pg. IEEE 802.16h-06/021.

IEEE Computer Society and the IEEE Microwave Theory and Techniques Society; IEEE Standards; 802.16, IEEE Standard for Local and metropolitan area networks; Part 16: Air Interface for Fixed Broadband Wireless Access Systems; Oct. 1, 2004; 895 pgs.

* cited by examiner

METHOD AND DEVICE FOR DETECTING NEIGHBORING BS INTERFERENCE INTERFERENTIAL NEIGHBORING BS

CROSS-REFERENCE TO RELATED APPLICATIONS

The present application is a continuation of International Application No. PCT/CN2007/071010, filed on Nov. 2, 2007, which claims priority to Chinese Patent Application No. 200610143860.6, filed on Nov. 3, 2006, both of which are hereby incorporated by reference in their entireties.

FIELD OF THE INVENTION

The present invention relates to a communication field, and in particular, to a method and device for detecting a neighboring BS interference and identifying an interferential neighboring BS.

BACKGROUND OF THE INVENTION

Currently, with the vigorous development of the broadband wireless access techniques, the technique of using the wireless resources to implement the broadband metropolitan access presents great vitality and has unanticipated potential markets.

Meanwhile, the radio frequency spectrum resources are fairly precious. Especially at an area that is not well planned or does not have licensed frequency bands, a plurality of base stations (BSs) may operate within the same channel. As a result, systems where the plurality of BSs belongs to are interfered with each other. In order to coordinate the coexistence among different devices under the same frequency band, especially the coexistence among devices under a License-Exempt (LE) frequency band, certain coexistence mechanisms among devices need to be constructed.

A neighboring BS mentioned in the present invention refers to a BS with a valid common coverage area, that is, a BS containing valid subscriber stations (SSs) in the common coverage area. For example, as shown in FIG. 1, a BS1 and a BS2 are located quite close to each other in terms of geography positions, and any one of the BS1 and the BS2 is located within the other's coverage area; however, since there are no SSs within the common coverage area of the BS1 and the BS2, no severe influences are caused to the wireless networks of each other, and thus the BS1 and the BS2 are not neighboring BSs. An overlapping area between the BS2 and a BS3 is smaller, and neither the BS2 nor the BS3 is located within the other's coverage area; however, there are SSs within the overlapping area there-between, which may cause interferences to the wireless networks of each other, so the BS2 and the BS3 are neighboring BSs herein.

A community mentioned herein refers to a set of a group of BSs under the same environment, in which any sub-set formed by one BS or some BSs at least has a valid common coverage area with a BS within the community that does not belong to the sub-set.

Due to the above-mentioned potential competition about resources, it is quite important for the BSs under the LE frequency band to negotiate with neighboring BSs to solve the coexistence problem. When distributing air interface resources, the BS utilizes competitive air interface resources (for example, a time period, a sub-channel, and the like) to make communications with SSs in non-interferential areas, and utilizes exclusive air interface resources (for example, a time period, a sub-channel, and the like) to make communications with SSs in interferential areas.

In the LE frequency band, there may be interferences caused by different types of BSs. In order to enable negotiations among different types of BSs, certain intervals need to be divided between frames under normal communication, so as to transmit energy signals and to bear a coexistence signaling. Such intervals are called coexistence signaling intervals (CSIs) herein. The CSI presents according to a certain cycle, and the parameters of the CSI, such as an initial position and an interval length, must be stipulated and known by all the BSs in the LE frequency band within each community of the same area.

Within a community, each BS periodically broadcasts a coexistence signaling message thereof in the CSI interval, and an initializing BS (IBS) also needs to broadcast a coexistence signaling message thereof, so as to enable a negotiation with neighboring BSs. The coexistence signaling message includes a BS address, a proxy server address, or a BS identifier (BSID), and is completely transmitted within one frame formed by one or more CSI intervals.

Operating BSs (OBSs) broadcast coexistence signaling messages thereof according to the same cycle within the same community. The BSs occupying different resources may share the same CSI. For example, as shown in FIG. 2, one community includes N channels, 16 CSIs are taken as one circulating cycle, so that each BS selects to occupy one CSI from the 16 CSIs, and the BSs on the same channel cannot share the same CSI. It is assumed that 10 CSIs are required for completely transmitting a coexistence signaling message of a BS, 160 CSIs are required for completely broadcasting one coexistence signaling message of the BS.

In a CSI interval, the BS broadcasts the message in a form of energy symbols, that is, information about 0, information about 1, starting information, or finishing information is respectively represented by an energy magnitude of a sent signal. As shown in FIG. 3, each energy symbol includes two parts, namely Part 1 and Part 2. As for the symbol 0, both Part 1 and Part 2 do not have sending energy; as for the symbol 1, both Part 1 and Part 2 have the same sending energy at a certain quality; and as for the starting and finishing symbols, only one of Part 1 and Part 2 has a certain sending energy. During a receiving motion, if the energies of Part 1 and Part 2 are both lower than a preset threshold, it is determined that the transmitted symbol is 0, and if the energies of Part 1 and Part 2 are both higher than the preset threshold, it is determined that the transmitted symbol is 1. Especially, if the energy of Part 1 is different from that of Part 2, it may be determined as a starting symbol or a finishing symbol. One CSI interval is able to deliver one or more energy symbols.

The above mechanism can solve the problem about communication resource negotiation when an IBS in the LE frequency band joins a community, but cannot solve the following problems.

As shown in FIG. 4, when a subscriber station 1 (SS1) is located at an original position indicated by a dashed line, the BS3 and the BS4 do not have valid common coverage area with each other, so they are not neighboring BSs. However, when the SS1 moves from the position indicated by the dashed line to a position indicated by a solid line, the BS3 and the BS4 are turned to become neighboring BSs, and accordingly, the community where the BS3 belongs to and the community where the BS4 belongs to need to be converged, so that the BS3 may bring co-channel interference (CCI) to the SS1. Definitely, other factors such as changes in environmental conditions may also cause two BSs that originally are not neighboring BSs to become neighboring BSs.

If the BS3 and the BS4 originally occupy the same resources, the two BSs may cause interferences at the SS1, so that the two BSs need to negotiate with each other about the communication resources, thereby realizing a coexistence effect. Assuming that the BS3 and the BS4 just occupy the same CSI, the SS1 fails to recognize an energy message broadcasted by the BS3 in the CSI, that is, fails to recognize the interferences, and thus the BS3 and the BS4 fail to enable a negotiation.

To sum up, if two OBSs originally are not neighboring BSs, they definitely can share the same CSI channel. Unfortunately, if the two OBSs are turned into neighboring BSs due to certain reasons such as environmental change or movement of SS, the SS under interferences cannot detect the newly appeared OBS neighboring BS.

Therefore, a mechanism for ensuring that the SS can detect the interference and identify an interferential source is needed, so as to achieve a coexistence mechanism for making negotiations among BSs.

In the above example, due to the SS1, the two OBSs are turned to become neighboring BSs. Since the two OBSs work in the same channel, the SS1 fails to correctly receive information about the BS thereof, but the SS1 can simulate a neighboring BS to produce interferences by using the known CSI information, and then broadcast the interferences to the surrounding SSs. The known CSI information includes a position or a cycle and a CSI reserved for the IBS, and the like. Accordingly, the SS1 simulates a neighboring BS to produce interferences in the CSI cycle reserved for the IBS, and broadcasts the interferences to the surrounding SSs. Such technique requires additional SSs existing surrounding the SS1, otherwise it cannot be used.

Therefore, a technical solution for detecting neighboring BS interference by an SS is needed, so as to solve the problems in the above prior art.

SUMMARY OF THE INVENTION

In an embodiment, the present invention is directed to a method and a device for detecting a neighboring BS interference, and a method and a device for identifying an interferential neighboring BS, so as to solve a problem about a resource conflict raised when two BSs which originally are not neighboring BSs become neighboring BSs because of changes of a terminal's position and environmental conditions.

The embodiment of the invention provides a method for detecting a neighboring BS interference, which includes the following steps.

A BS informs a coexistence signaling interval (CSI) information to an SS in a wireless access system.

The SS obtains a silent period in a CSI from the CSI information, and monitors an interference information from a neighboring BS during the silent period.

The SS reports the monitored interference information to the BS.

The embodiment of the invention provides a device for detecting a neighboring BS interference, which includes a CSI information informing module, a interference monitoring module, and a reporting module.

The CSI information informing module is adapted to instruct a BS to inform a CSI information to an SS in a wireless access system.

The interference monitoring module is adapted to instruct the SS to obtain a silent period in a CSI from the CSI information, and to monitor an interference information from a neighboring BS during the silent period.

The reporting module is adapted to instruct the SS to report the monitored interference information to the BS.

The embodiment of the invention provides a method for identifying an interferential neighboring BS, which further includes the following steps.

A BS enters a back-off status in an occupied CSI.

Once the BS enters the back-off status, the BS informs an SS that reports an interference detection result to identify an interferential neighboring BS, or informs all the SSs to identify interferential neighboring BSs.

The SS receives a broadcast message from the interferential neighboring BS in the CSI, and reports the correctly-received broadcast message or an error information to the BS.

The BS identifies the interferential neighboring BS by using the information reported by the SS.

The embodiment of the invention a device for identifying an interferential neighboring BS, which includes a back-off status entering module, an instruction identifying module, a reporting module, and an interferential neighboring BS identifying module.

The back-off status entering module is adapted to instruct the BS to enter a back-off status in an occupied CSI.

The instruction identifying module is adapted to inform an SS that reports an interference identification result to identify an interferential neighboring BS or inform all the SSs to identify interferential neighboring BSs once the BS enters the back-off status.

The reporting module is adapted to instruct the SS to receive a broadcast message from the interferential neighboring BS in the CSI, and to report the correctly-received broadcast message or an error information to the BS.

The interferential neighboring BS identifying module is adapted to instruct the BS to identify the interferential neighboring BS by using the information reported by the SS.

Through the present invention, when two BSs that originally are not neighboring BSs become neighboring BSs due to the change of an SS's position or environmental conditions, the BS can accurately identify such circumstance, so as to solve the problem of resource conflict raised thereby.

BRIEF DESCRIPTION OF THE DRAWINGS

The present invention will become better understood from the detailed description given herein below for illustration only, and thus are not limitative of the present invention, and wherein.

DETAILED DESCRIPTION OF THE EMBODIMENTS

The specific implementations of the embodiments of the present invention are described below in detail with reference to the accompanying drawings.

In the embodiments of the present invention, a BS requires an SS in the current system to monitor a coexistence message broadcasted by the BS. When an abnormal energy is detected during a period in which energy sending should be stopped, the BS enables the SS to receive a broadcast message from a neighboring BS in the current CSI interval through a certain manner, such as CSI back-off, so as to partially solve the problems caused by converging communities.

Referring to FIGS. 5-8, a method for detecting and identifying a neighboring BS interference according to embodiments of the present invention is illustrated below.

Figure 5:
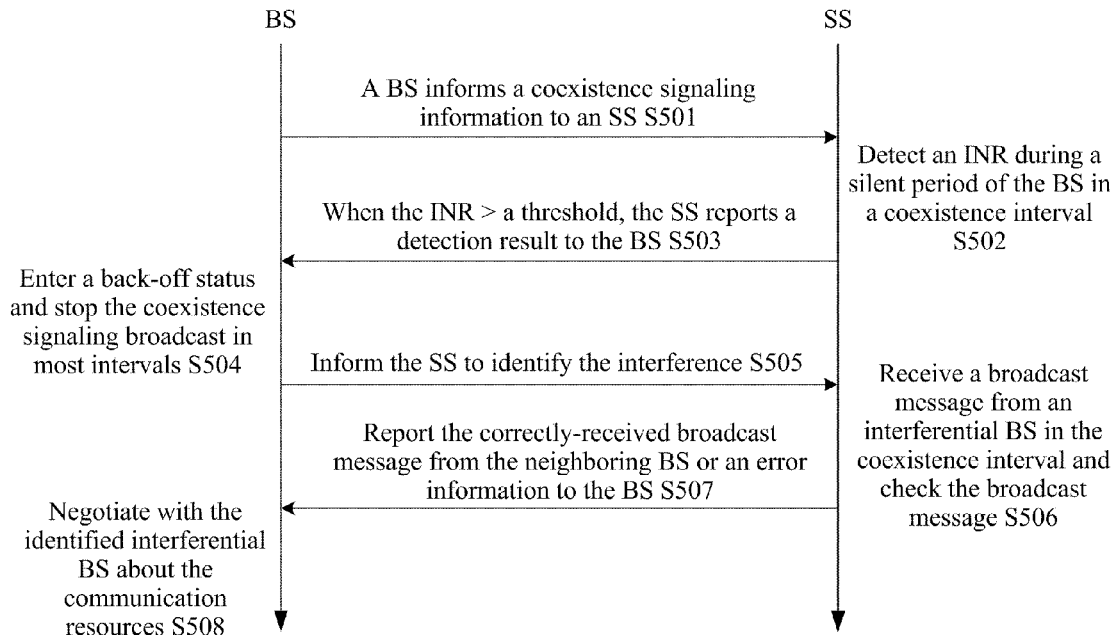
FIG. 5 is an interaction diagram between a BS and an SS in a method for identifying and detecting a neighboring BS interference according to an embodiment of the present invention.

As shown in FIG. 5, a method for detecting a neighboring BS interference according to an embodiment of the present invention includes the following steps. In Step S501, a BS informs an SS of a coexistence signaling information. In Step S502, the SS detects an interference-to-noise ratio (INR) during a silent period of the BS in a coexistence interval. In Step S503, when the INR is larger than a preset threshold, the SS reports a detection result to the BS. In Step S504, the BS enters a back-off status, and stops the coexistence signaling broadcasting in most intervals. In Step S505, the BS instructs the SS to identify an interferential source. In Step S506, the SS receives a broadcast message from an interferential BS in the coexistence interval and checks the broadcast message. In Step S507, the SS reports the correctly-received broadcast message from the neighboring BS or an error information to the BS. In Step S508, the BS negotiates with the identified interferential BS about the communication resources.

In Step S501, the BS informs an SS of the coexistence signaling information in the current system. The coexistence signaling information includes a time period when the BS is in a silent status, and a CSI interval occupied by the BS in the community, and the like.

When the BS stops sending signals or a sending energy is at a minimum level in the occupied CSI interval, the BS is in the silent status. A silent period is a time period when the BS is in the silent status.

Figure 1:
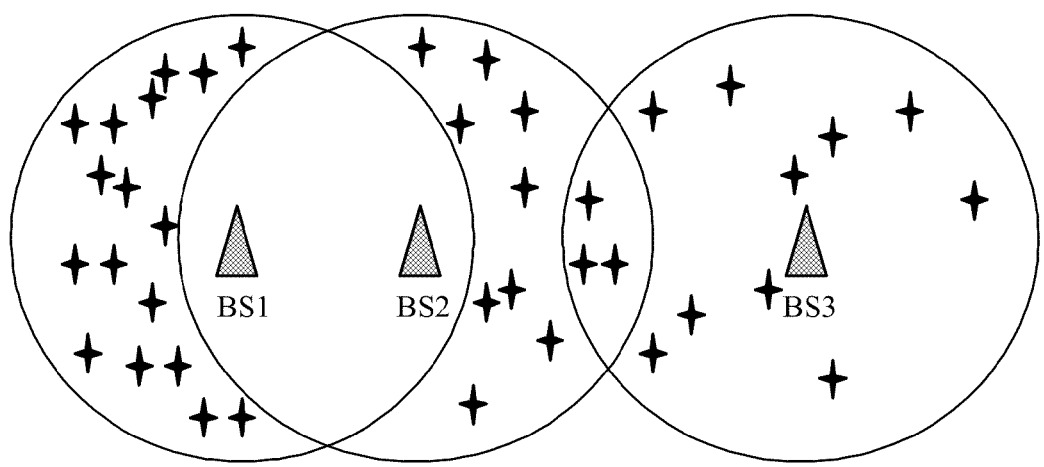
FIG. 1 is a schematic view of neighboring BSs.
Figure 2:
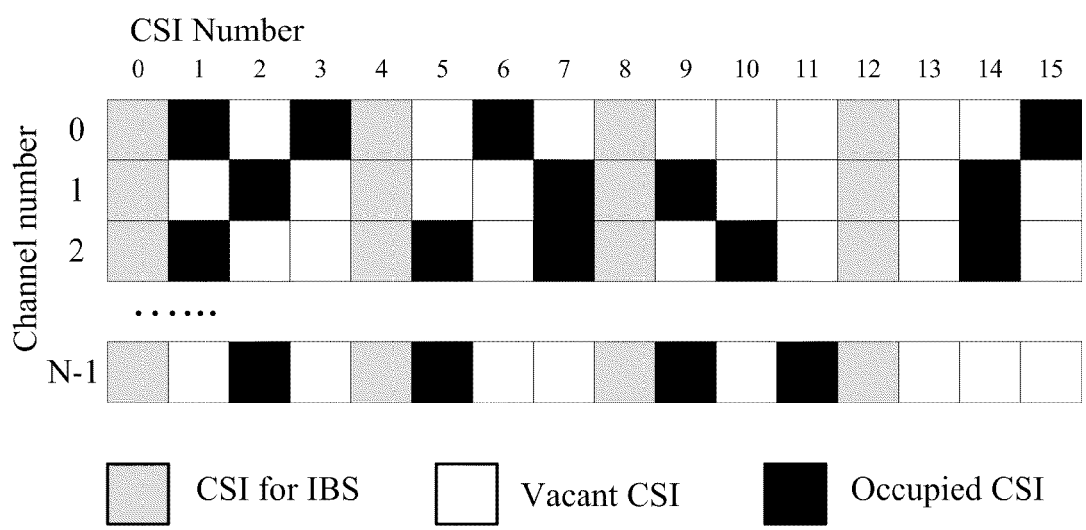
FIG. 2 is a schematic view of CSI occupied by an OBS.
Figure 3:
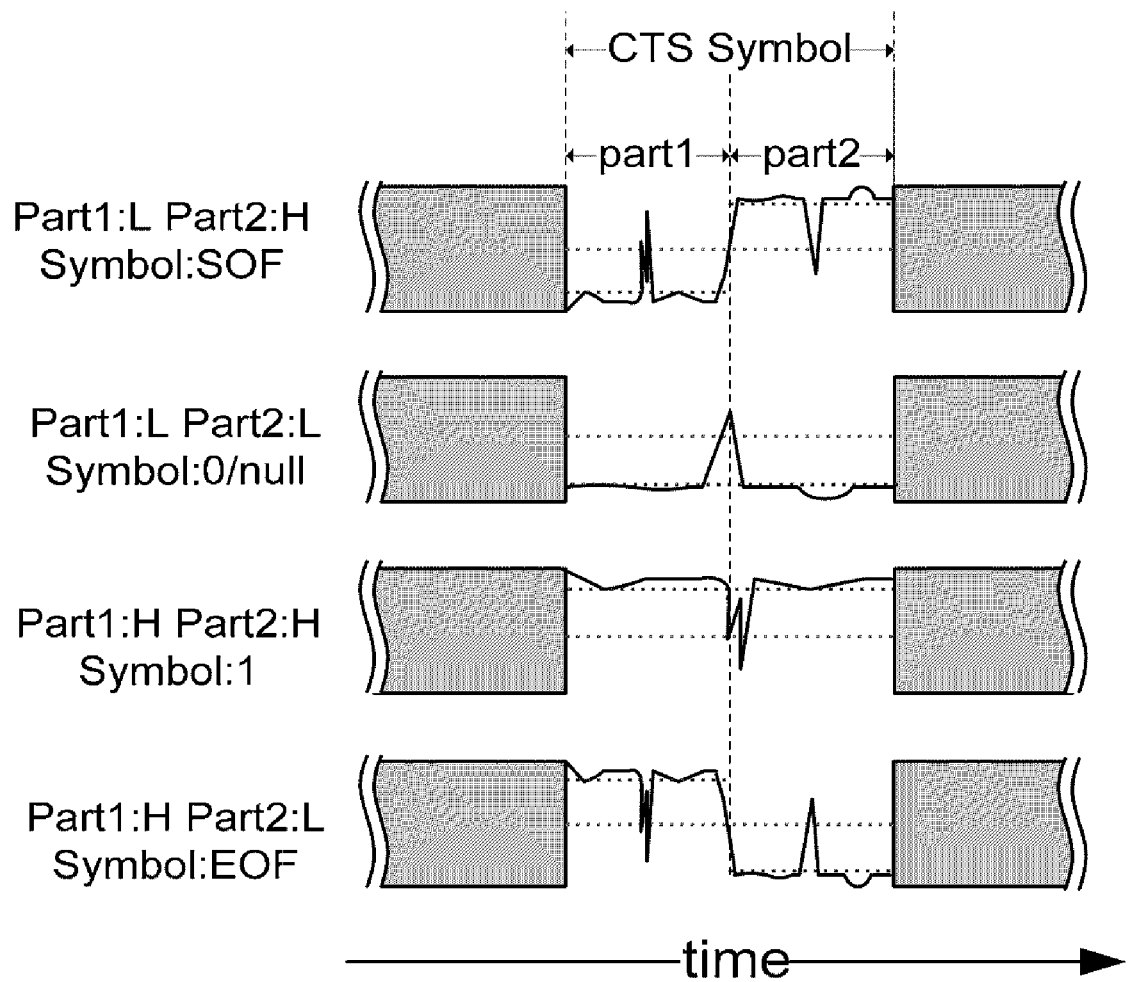
FIG. 3 is a schematic view of an energy symbol.
Figure 4:
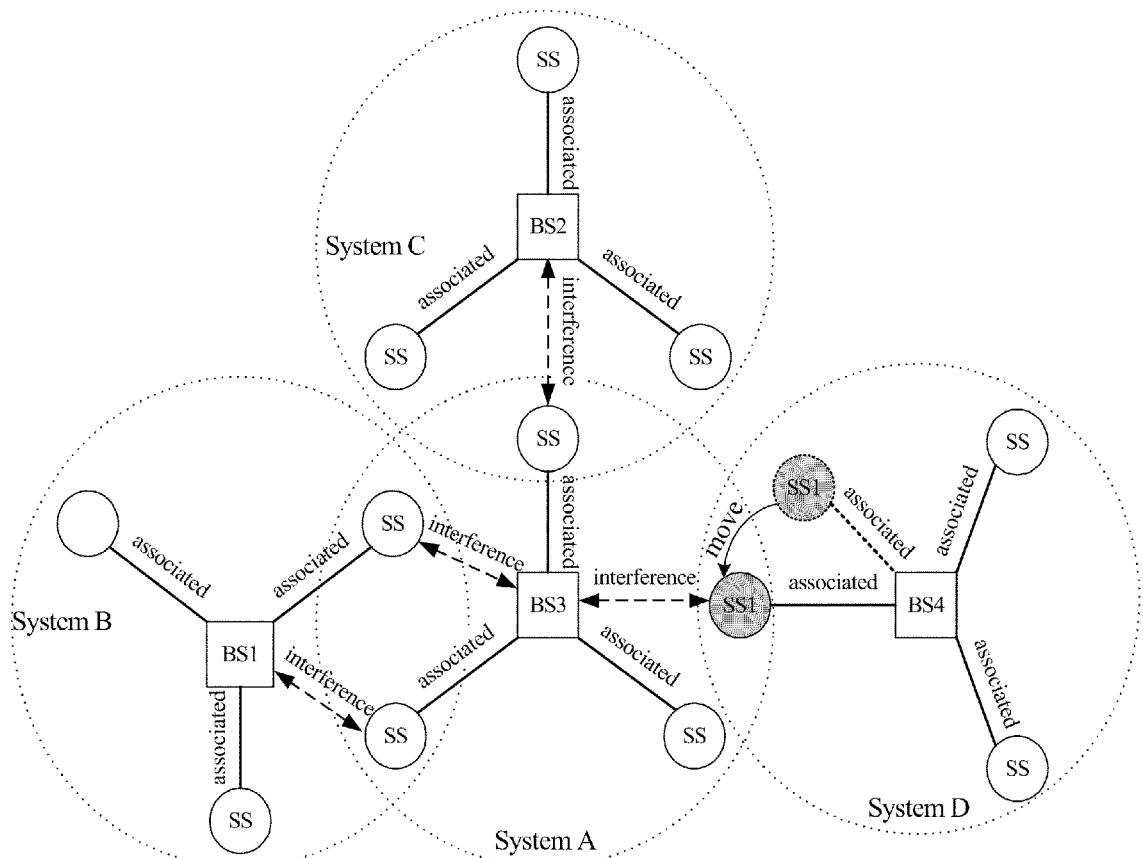
FIG. 4 is a schematic view showing two non-neighboring BSs becoming neighboring BSs.

As shown in FIG. 3, in the CSI interval, when sending the symbol 0, the sending energy of the BS is at the minimum level or is 0, that is, the time period when the BS sends the symbol 0 is the time period that the BS is in the silent status. Definitely, in Part 1 or Part 2 when the BS sends the starting symbol or the finishing symbol, the BS is also in the silent status.

The signal energy detected by the SS at an air interface is a sum of the energy of the sent signal after attenuation and energies of noises and interferences. Generally, in the silent period, no interference from a neighboring BS exists, so that the SS merely detects the energy of a noise floor.

The silent period may be represented by an absolute time, or by a relative time in symbol widths.

The silent period of the BS may be indirectly obtained by the SS by sending a coexistence signaling message to the SS. The SS determines a symbol sent by the BS through a content of the coexistence signaling message, thereby further determining the silent period of the BS in the CSI.

Figure 6:
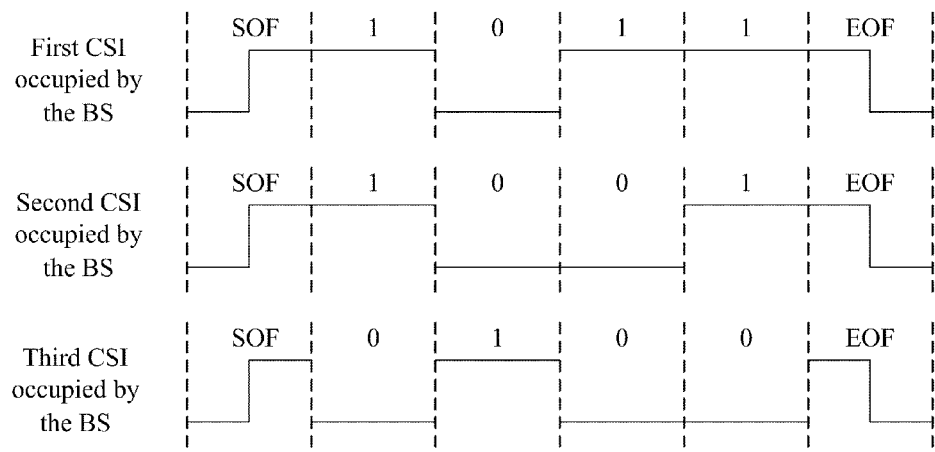
FIG. 6 is a diagram showing an example of a silent period according to an embodiment of the present invention.

FIG. 6 shows a simple example, in which the content of the coexistence signaling message from the BS is b10110010100, and it is assumed that the BS can only send 4 energy symbols at each CSI interval, so that totally 3 CSI intervals are required for transmitting the coexistence signaling message. The SS can determine that the BS is in the silent status at the second data symbol time point of the first CSI, at the second and third data symbol time points of the second CSI, and at the first, third, and fourth data symbol time points of the third CSI occupied by the BS.

In Step S502, the SS detects the INR during the silent period of the BS.

In order to measure the INR, the SS must first measure an average power (PN) of a noise floor during the silent periods. Upon determining the silent periods, the SS monitors an air interface during the silent periods. Under a normal status, since the silent periods are within the CSI, no co-channel interference exists, so that the noises detected by the SS are basically stable noise floors. The average power of the noise floors may be obtained by calculating an average of the measured powers. For example, the powers of sample time points in a plurality of continuous silent periods are calculated in a statistical manner and then an average thereof is obtained, that is, the average power of the noise floor. Definitely, the measurement of the noise floor may also be implemented by an SS designated by the BS in a corresponding interval. Such calculating process may be achieved in various manners, for example, slide window or segmentation, and any manner may be adopted as long as it can basically reflect the current noise situation.

If it is assumed that an average power detected by the SS during a certain silent period of the BS is PS, and the originally recorded average power of the noise floor is PN, the INR is calculated by a following equation:

$$INR=10 \log [(Ps-Pn)/Pn]dB.$$

If the INR obtained from the above equation is larger than a preset threshold, for example, INR>−6 dB, the SS determines that an interferential neighboring BS exists.

If the INR obtained from the above equation is smaller than the preset threshold, the SS determines that no interferential neighboring BS exists, and the average power PS detected during the silent period is used to update the average power PN of the noise floor.

In Step S503, after determining that the INR is larger than the preset threshold, the SS timely reports a detection result to the BS where the SS belongs to. Under such a circumstance, the SS is generally located at an edge of a coverage area of an interferential neighboring BS, and once the SS detects the interference at the very beginning, the power of an interferential signal is not quite high, and the power of the interferential noise is increased slowly due to the long distance from the interferential source.

The detection result reported by the SS may be the INR measured by the SS or a notification message to indicate that the SS has detected an interferential neighboring BS.

In Step S504, after receiving the interference detection result reported by the SS, the BS enters a back-off status, that is, stops most of the coexistence signaling broadcast in the CSI intervals occupied by the BS.

Once receiving the interference detection result reported by the SS, the BS determines that a co-channel interferential neighboring BS may exist around the SS. Thus, the two BSs need to negotiate with each other to avoid collision, which, however, requires the current BS to identify the interferential neighboring BS. Since the information reported by the SS merely indicates that certain interference exists, but does not carry any information about the interferential source, the SS is further required to identify the interferential source.

The interferential neighboring BS also broadcasts its coexistence signaling message in a CSI. However, since the BS and the interferential neighboring BS occupy the same information and occupy the same CSI, the SS within the interfered area cannot completely receive the coexistence signaling message broadcasted by the interferential neighboring BS. Therefore, as long as the current BS stops the broadcasts in the CSI intervals, i.e., the current BS is in the silent status at all time points during the coexistence intervals, it is referred to as entering a back-off status, and the SS can completely receive the information from the interferential neighboring BS.

Definitely, there may also be an SS of the interferential neighboring BS in the interferential area and the SS may also report a similar interferential detection message to the interferential neighboring BS, so that the interferential neighboring BS carries out similar processing operations, that is, enters a back-off status, and stops the broadcasts in the coexistence intervals. As a result, the SSs of both parities still cannot identify each other. Therefore, once receiving the interference detection message reported by the SS, the BS enters the back-off status and stops most of the broadcasts in the CSI intervals, but continues broadcasting the coexistence signaling message in certain random intervals. In this way, the possibility for the SS of the opposite party to completely receive the coexistence signaling message is greatly increased.

In Step S505, after entering the back-off status, the BS instructs the SS that reports the detection message or all SSs to identify the interferential source. Under the back-off status, the BS randomly selects CSI intervals from the CSI intervals occupied by the BS at a rather small possibility, for example, 10%, for sending the coexistence signaling message, and most of the other periods, the BS is in the silent status. If the sending motion of the coexistence signaling message requires a plurality of CSIs, the CSI interval for initiating the sending motion is also randomly selected from all the intervals, which greatly reduces the possibility that both the two BSs broadcast at the same time, and the SS under interference is able to completely receive the broadcast message sent by the interferential neighboring BS.

In Step S506, the SS receives the broadcast message from the interferential neighboring BS in the coexistence interval, and checks the received message.

In Step S507, the SS reports an interference identifying report. If the received message is correct, the SS reports the message as a content of the identifying report to the BS which the SS belongs to. If the received message is checked to be incorrect, or no complete message is received within the set time, the SS reports an error information to the BS. The BS may also set a timing operation, and if the BS does not receive any valid interference identifying report within the set time period, the BS exits the back-off status.

In Step S508, after receiving the message checked to be corrected by the SS, the BS retrieves an identifier or address information from the message, and enables a negotiation process with a BS indicated by the identifier or the address indication about the communication resources.

Figure 7:
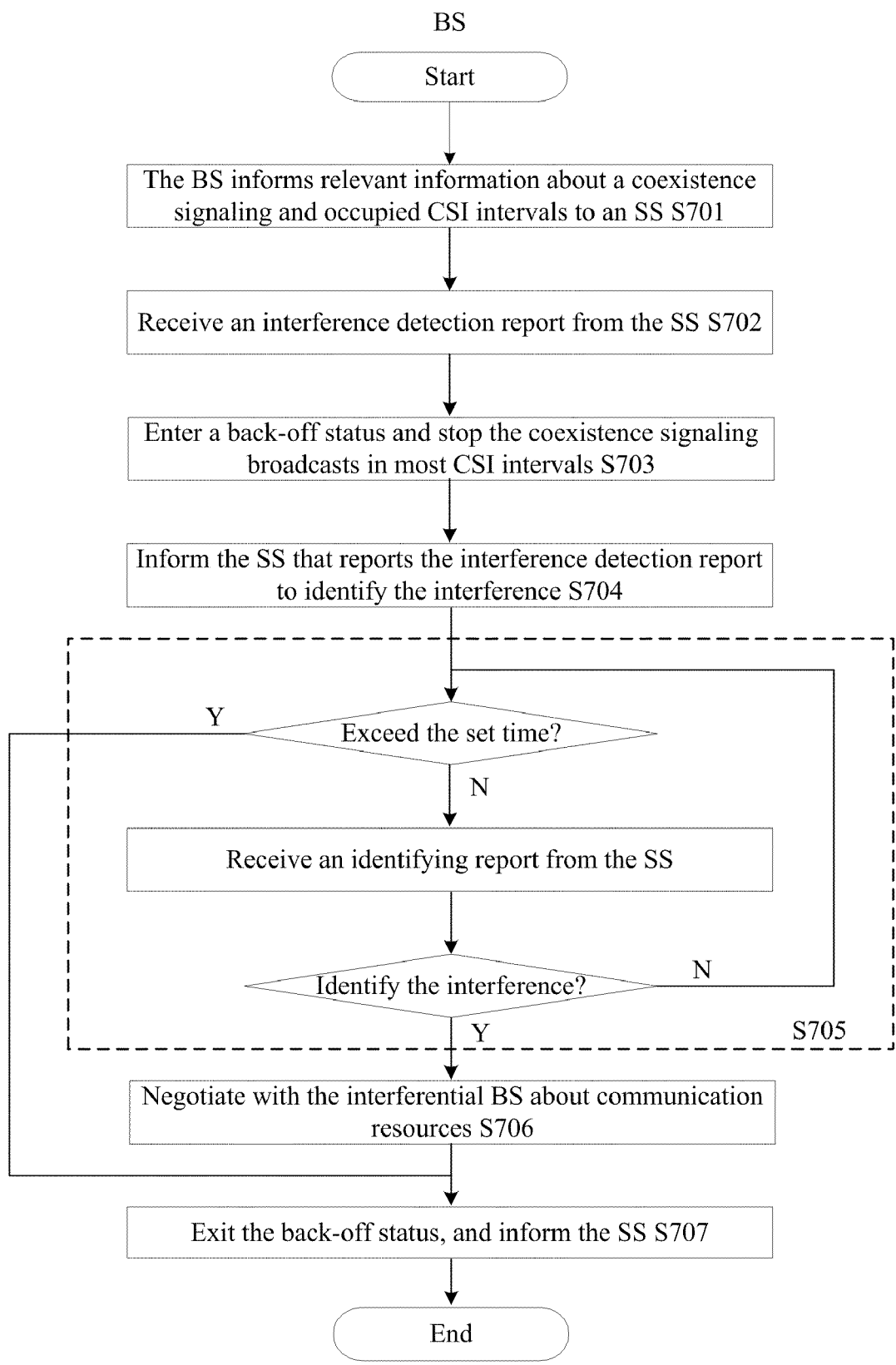
FIG. 7 is a flow chart of operations of a BS in a method for detecting and identifying a neighboring BS interference according to an embodiment of the present invention.

Particularly, FIG. 7 is a working flow chart of a BS.

In Step S701, the BS informs an SS of relevant information about a coexistence signaling and occupied CSI intervals. Then, Step S702 is performed.

In Step S702, the BS receives an interference detection report from the SS. If the BS receives an interference detection report from the SS, Step S703 is performed.

In Step S703, the BS enters a back-off status, i.e., stops the coexistence signaling broadcasts in the CSI intervals, and randomly selects a portion of intervals for continuing broadcasting. Then, Step S704 is performed.

In Step S704, the BS informs the SS that reports the interference detection report or all SSs to identify an interferential source. Then, Step S705 is performed.

In Step S705, the BS receives the interference identifying report from the SS. If the received report indicates that the SS has identified an interferential neighboring BS, Step S706 is performed. In step S705, the BS may set an identification time, and if no valid identifying report is received within the identification time, Step S707 is performed.

In Step S706, the BS negotiates with the identified interferential neighboring BS about communication resources, and Step S707 is performed.

In Step S707, the BS exits the back-off status, and informs the SS that the process is finished.

Figure 8:
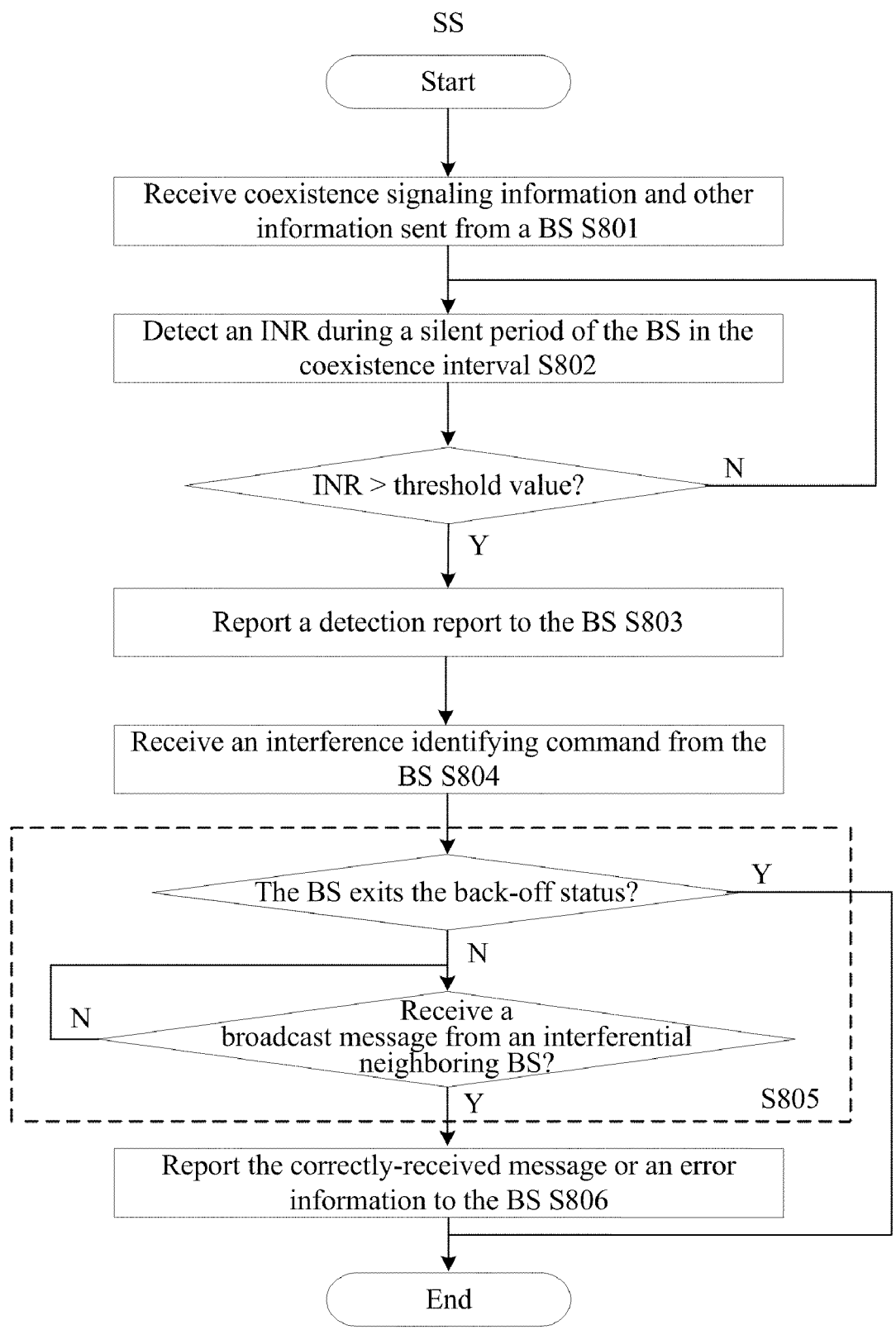
FIG. 8 is a flow chart of operations of an SS in a method for detecting and identifying a neighboring BS interference according to an embodiment of the present invention.

Particularly, FIG. 8 is a working flow chart of an SS under interference. The working process of the SS under interference includes the following steps.

In Step S801, the SS receives a coexistence signaling information sent from a BS, including information about CSI intervals occupied by the coexistence signaling. Then, Step S802 is performed.

In Step S802, the SS detects an average power of a noise floor during a silent period of the BS, and calculates an INR. If the calculated INR is larger than a preset threshold, Step S803 is performed; otherwise, it continues detecting an INR.

In Step S803, the SS reports a detection report to the BS. Then, Step S804 is performed.

In Step S804, the SS receives an interference identifying command from the BS. Then, Step S805 is performed.

In Step S805, the SS receives a broadcast message from an interferential neighboring BS in the CSI intervals occupied by the BS. Then, Step S806 is performed.

In step S805, if the SS receives an indication that the BS exits the back-off status, the SS stops identifying the interferential neighboring BS, and the flow ends.

In Step S806, the SS checks the received broadcast message, and if the received broadcast message is correct, the SS reports the received message to the BS; if an error occurs, or a timeout occurs, the SS reports an error information to the BS, and the flow ends.

As known from the above, the embodiments of the present invention provide a method for detecting a neighboring BS interference and a method for identifying an interferential neighboring BS.

Figure 12:
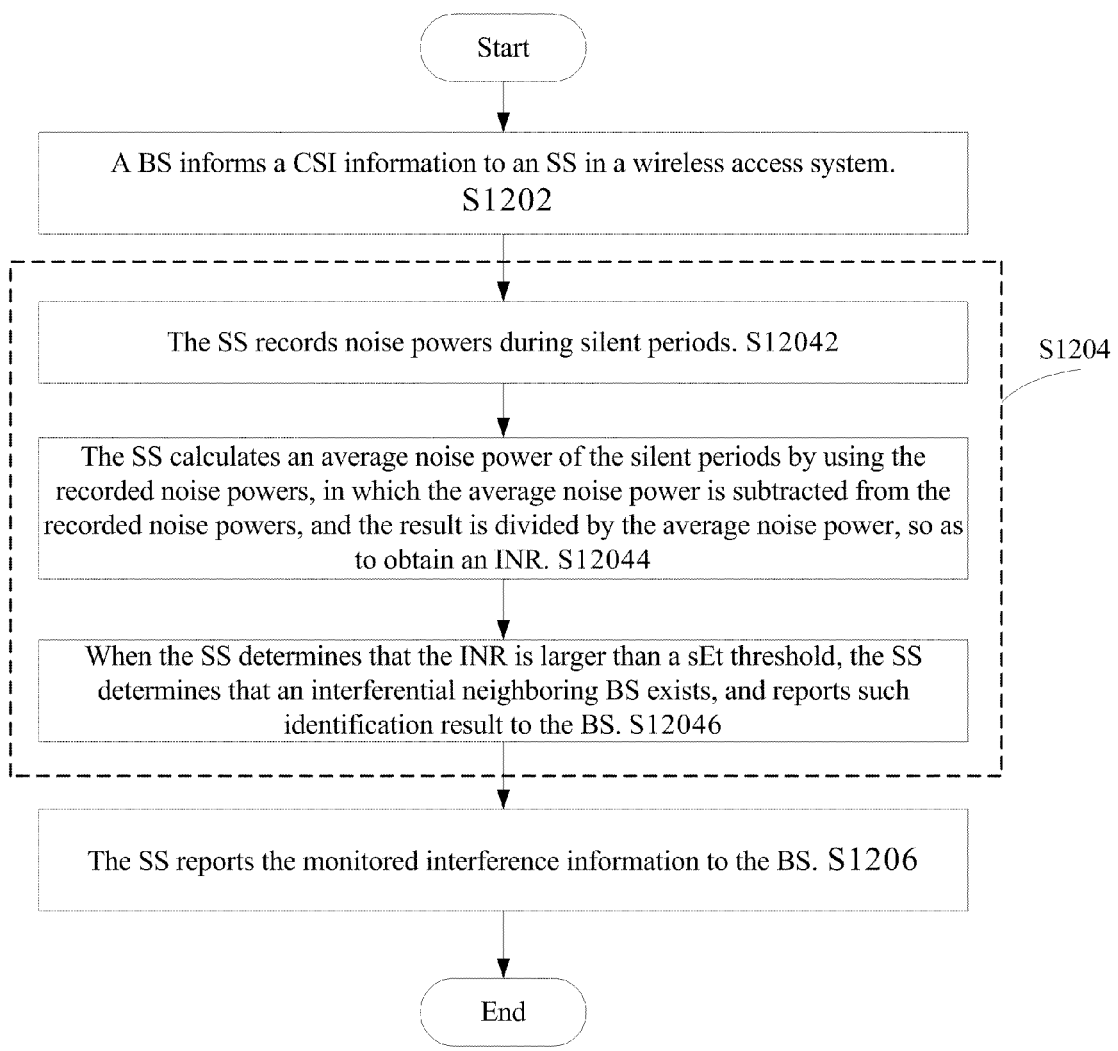
FIG. 12 is a flow chart of a method for detecting a neighboring BS interference according to an embodiment of the present invention.

As shown in FIG. 12, the method for detecting a neighboring BS interference according to an embodiment of the present invention includes the following steps. In Step S1202, a BS informs a CSI information to an SS in a wireless access system. In Step S1204, the SS obtains a silent period in a CSI from the CSI information, and monitors an interference information from a neighboring BS during the silent period. In Step S1206, the SS reports the monitored interference information to the BS.

The silent period is a time period when the BS stops sending signals or a sending energy thereof is at a minimum level or is 0 in the CSI.

The CSI information includes silent period information, which records silent periods. The silent period information includes CSI information occupied by the BS and a position of the silent period in the CSI. Optionally, the CSI information includes a content of a coexistence signaling message broadcasted by the BS during the CSI. The SS obtains the silent period according to the CSI information and the content of the coexistence signaling message. The coexistence signaling message includes a BS address and/or a proxy server address of the BS and a BS identifier (BSID), which is propagated in a form of energy symbol during the CSI, and the time period with the energy symbol as 0 during the CSI is a silent period.

The process that the SS monitors the neighboring BS interference during the silent period includes the following steps. In Step S12042, the SS records noise powers during silent periods. In Step S12044, the SS calculates an average noise power of the silent periods by using the recorded noise powers, in which the average noise power is subtracted from the recorded noise powers to obtain a result, and the result is divided by the average noise power, so as to obtain an INR. In Step S12046, when the SS determines that the INR is larger than a preset threshold, the SS determines that an interferential neighboring BS exists, and reports such identification result to the BS.

Figure 13:
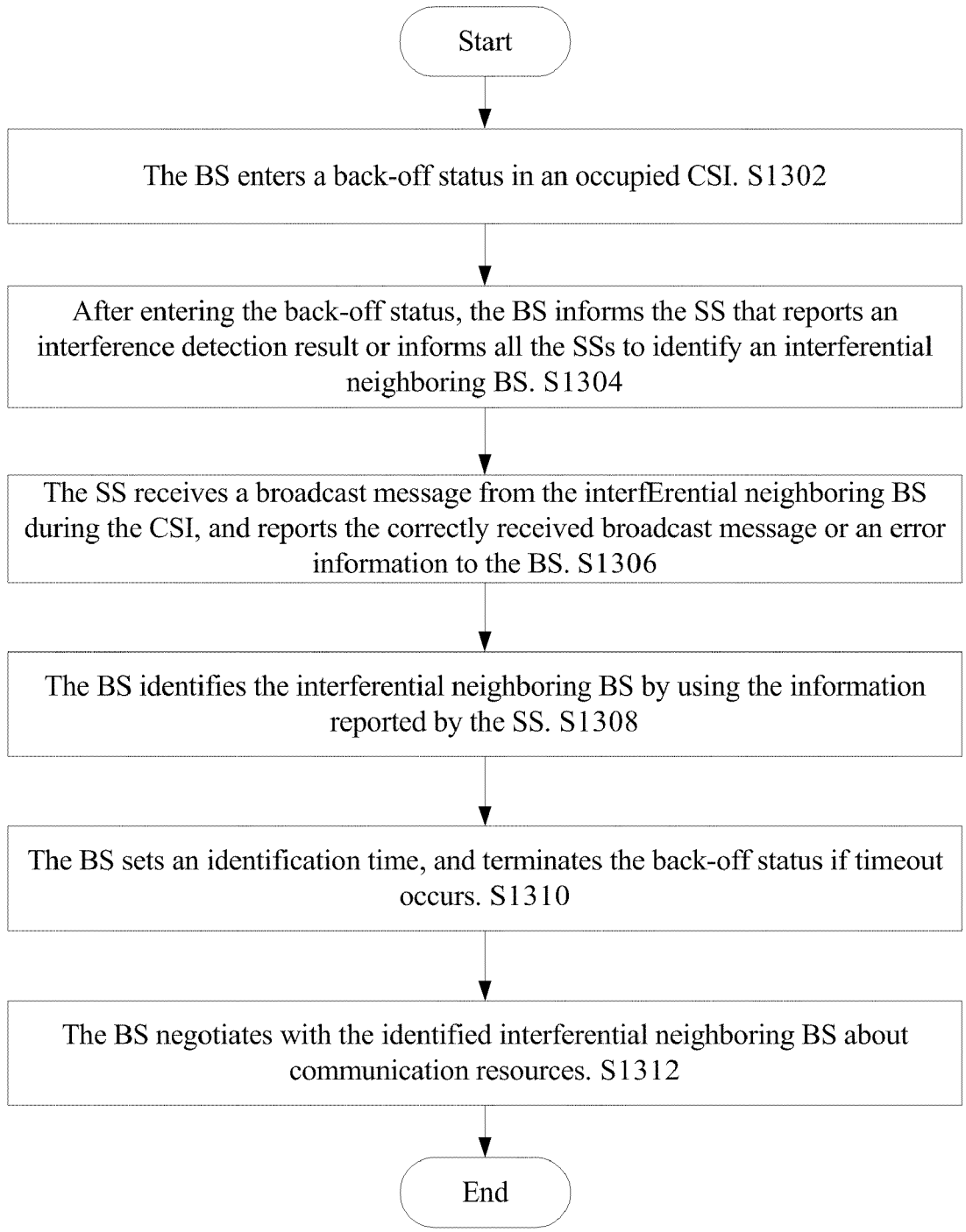
FIG. 13 is a flow chart of a method for identifying an interferential neighboring BS according to an embodiment of the present invention.

As shown in FIG. 13, the method for identifying an interferential neighboring BS according to an embodiment of the present invention includes the following steps. In Step S1302, the BS enters a back-off status in an occupied CSI. In Step S1304, after entering the back-off status, the BS informs the SS that reports an interference detection result or informs all the SSs to identify an interferential neighboring BS. In Step S1306, the SS receives a broadcast message from the interferential neighboring BS during the CSI, and reports the correctly received broadcast message or an error information to the BS. In Step S1308, the BS identifies the interferential neighboring BS by using the information reported by the SS.

The broadcast message is a coexistence signaling broadcast. Upon receiving an interference status detection report from the SS, the BS enters the back-off status. If no broadcast message is received within a set time, the SS reports the error information to the BS.

The method for identifying an interferential neighboring BS further includes the following steps. In Step S1310, the BS sets an identification time, and terminates the back-off status if timeout occurs. In Step S1312, the BS negotiates with the identified interferential neighboring BS about communication resources.

A device for detecting a neighboring BS interference and a device for identifying wan interferential neighboring BS according to embodiments of the present invention are illustrated below with reference to FIGS. 9-11.

Figure 9:
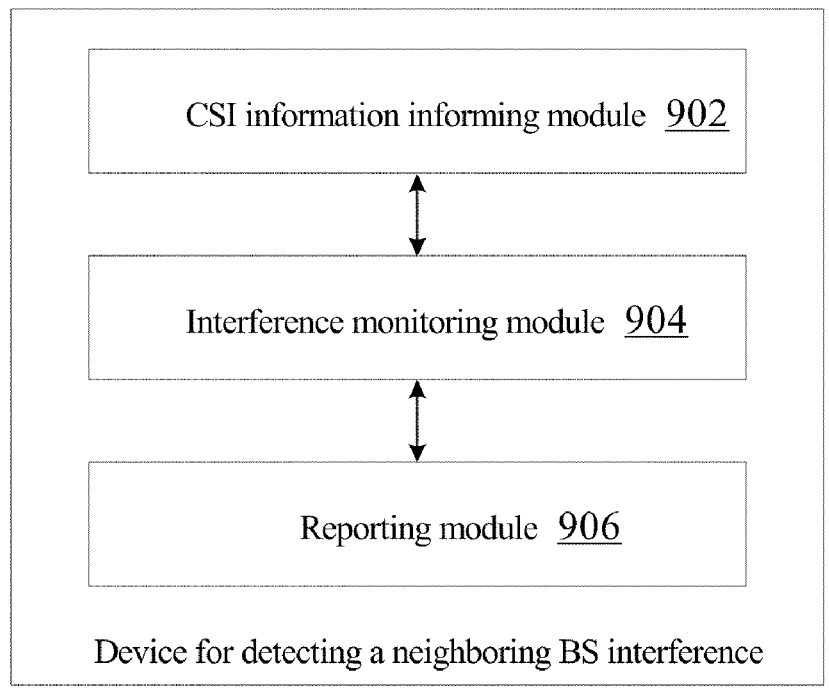
FIG. 9 is a block diagram of a device for detecting a neighboring BS interference according to an embodiment of the present invention.

As shown in FIG. 9, the device for detecting a neighboring BS interference according to an embodiment of the present invention includes: a CSI information informing module 902, adapted to instruct a BS to inform an SS of a CSI information in a wireless access system; an interference monitoring module 904, adapted to instruct the SS to obtain a silent period in a CSI from the CSI information and monitor an interference information from a neighboring BS during the silent period; and a reporting module 906, adapted to instruct the SS to report the monitored interference information to the BS.

The silent period is a time period when the BS stops sending signals or a sending energy thereof is at a minimum level or is 0 during the CSI.

The CSI information includes silent period information, which records silent periods. The silent period information includes CSI information occupied by the BS and a position of the silent period in the CSI. Optionally, the CSI information includes a content of a coexistence signaling message broadcasted by the BS during the CSI. The SS obtains the silent period according to the CSI information and the content of the coexistence signaling message. The coexistence signaling message includes a BS address and/or a proxy server address of the BS and a BS identifier (BSID), which is propagated in a form of energy symbol during the CSI, and the time period with the energy symbol as 0 during the CSI is a silent period.

Figure 10:
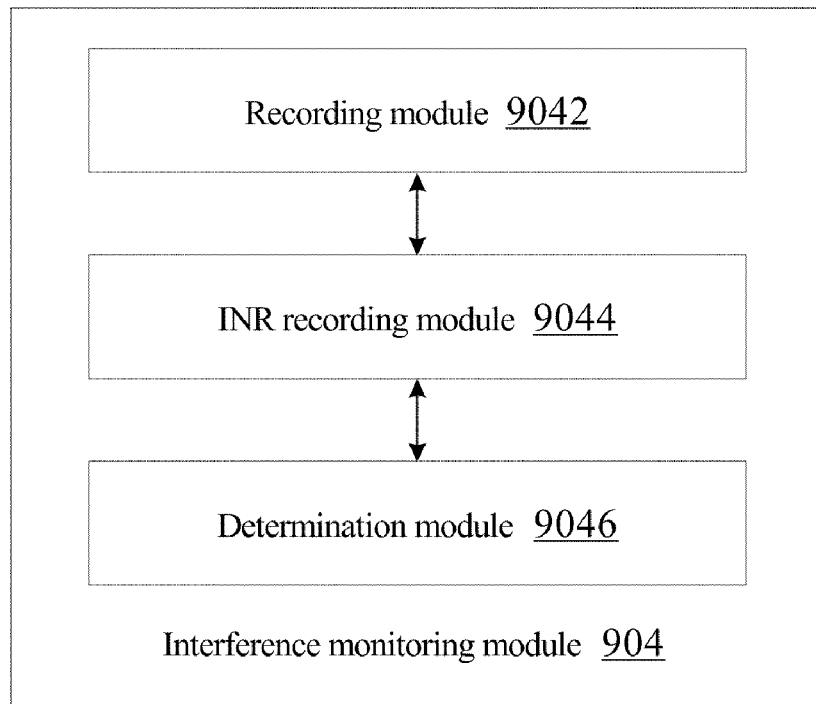
FIG. 10 is a block diagram of an interference monitoring module in a device for detecting a neighboring BS interference according to an embodiment of the present invention.

As shown in FIG. 10, the interference monitoring module 904 includes: a recording module 9042, adapted to instruct the SS to record noise powers of silent periods; an INR recording module 9044, adapted to calculate an average noise power of the silent periods by using the recorded noise powers, in which the average noise power is subtracted from the recorded noise powers, and then the result is divided by the average noise power, so as to obtained the INR; a determination module 9046, adapted to instruct the SS to determine that a neighboring BS interference exists when the SS determines that the INR is larger than a preset threshold, and to report such identification result to the BS.

Figure 11:
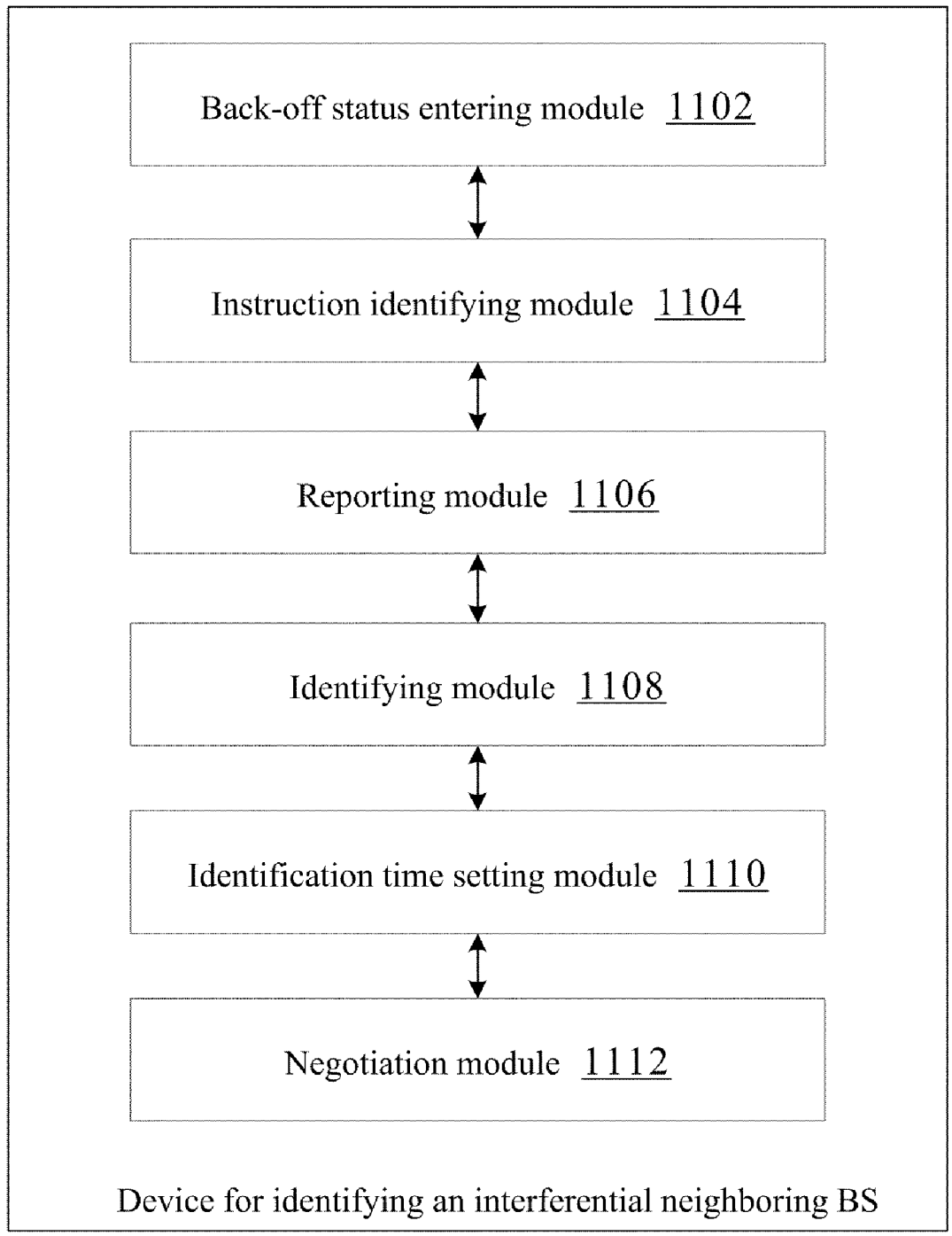
FIG. 11 is a block diagram of a device for identifying an interferential neighboring BS according to an embodiment of the present invention.

As shown in FIG. 11, the device for identifying an interferential neighboring BS includes: a back-off status entering module 1102, adapted to instruct a BS to enter a back-off status during an occupied CSI; an instruction identifying module 1104, adapted to inform an SS that reports an interference detection result or to inform all the SSs to identify an interferential neighboring BS after the BS enters the back-off status; a reporting module 1106, adapted to instruct the SS to receive a broadcast message from an interferential neighboring BS during the CSI, and report the correctly received broadcast message or an error information to the BS; and an interferential neighboring BS identifying module 1108, adapted to instruct the BS to identify the interferential neighboring BS by using the information reported by the SS.

The broadcast message is a coexistence signaling broadcast. The back-off status entering module is adapted to instruct the BS to enter the back-off status after receiving an interference status detecting report from the SS. The reporting module is adapted to instruct the SS to report an error information to the BS if no broadcast message is received within a set time.

The device for identifying an interferential neighboring BS further includes: an identification time setting module 1110, adapted to instruct the BS to set an identification time and to terminate the back-off status if timeout occurs; and a negotiation module 1112, adapted to instruct the BS to negotiate with the identified interferential neighboring BS about communication resources.

Through the embodiments of the present invention, when two BSs that originally are not neighboring BSs become neighboring BSs due to the change of an SS's position or environmental conditions, the BS is enabled to accurately identify such situation, so as to solve the problem about resource conflict raised thereby.

Apparently, those skilled in the art shall understand that, various modules or steps in the above embodiments of the present invention can be realized through universal calculating devices, which may be integrated in a single calculating device or distributed in a network formed by a plurality of calculating devices. Optionally, various modules or steps in the embodiments of the present invention may be realized by program codes executable by a calculating device, which thus may be stored in a storage device for being executed by a calculating device, or may be made into various integrated circuit modules, or many modules or steps selected therefrom are made into single integrate circuit module for being implemented. The embodiments of the present invention are not limited to any specific combination of software and hardware. It should be understood that, the variations for the embodiments of the present invention are apparent for persons skilled in the art, without departing from the scope of the spirits of the embodiments of the present invention.

The above embodiments are merely intended to describe the technical solutions of the present invention, but not to limit the scope of present invention. It will be apparent to those skilled in the art that various modifications and variations can be made to the structure of the present invention without departing from the scope or spirit of the invention.

What is claimed is:

1. A method for detecting a neighboring base station, BS, interference, comprising:
   receiving, by a subscriber station, SS, a coexistence signaling interval, CSI, information from a BS;
   obtaining, by the SS, a silent period in a CSI from the CSI information;
   monitoring, by the SS, an interference information from a neighboring BS during the silent period,
   wherein the silent period is a time period when the BS stops sending signals, or when sending energy of the BS is at a minimum level, or when sending energy of the BS has an energy symbol 0 during the CSI,
   wherein the CSI is an interval during which the BS transmits energy signals and bears a coexistence signaling.

2. The method for detecting a neighboring BS interference according to claim 1, further comprising:
   reporting, by the SS, the monitored interference information to the BS.

3. The method for detecting a neighboring BS interference according to claim 1, wherein the CSI information comprises CSI information occupied by the BS and a position of the silent period during the CSI.

4. The method for detecting a neighboring BS interference according to claim 1, wherein, the CSI information comprises a content of a coexistence signaling message broadcasted by the BS during the CSI; the coexistence signaling message comprises at least one of an address of the BS, a proxy server address of the BS, and a BS identifier, BSID.

5. The method for detecting a neighboring BS interference according to claim 1, wherein the monitoring, by the SS, a neighboring BS interference during the silent period further comprises:
   recording, by the SS, noise power during the silent period;
   calculating an average noise power of the silent period by using the recorded noise power, subtracting the average noise power from the recorded noise power to obtain a result, and dividing the result by the average noise power to obtain an interference-to-noise ratio, INR;
   determining, by the SS, that the neighboring BS interference exists if the INR is larger than a predetermined threshold; and
   reporting, by the SS, interference information of the neighboring BS to the BS.

6. A device for detecting a neighboring base station, BS, interference, comprising:
   a coexistence signaling interval, CSI, information informing module, adapted to instruct a BS to inform a subscriber station, SS, of a CSI information;
   an interference monitoring module, adapted to instruct the SS to obtain a silent period in a CSI from the CSI information and monitor an interference information from a neighboring BS during the silent period; and
   a reporting module, adapted to instruct the SS to report the interference information to the BS,
   wherein the silent period is a time period when the BS stops sending signals, or when sending energy of the BS is at a minimum level, or when sending energy of the BS has an energy symbol 0 during the CSI,
   wherein the CSI is an interval during which the BS transmits energy signals and bears a coexistence signaling.

7. The device for detecting a neighboring BS interference according to claim 6, wherein the interference monitoring module further comprises:
   a recording module, adapted to instruct the SS to record noise power during the silent period;
   an interference-to-noise ratio, INR, recording module, adapted to calculate an average noise power of the silent period by using the recorded noise power, subtract the average noise power from the recorded noise power to obtain a result, and then divide the result by the average noise power, so as to obtain an INR; and
   a determination module, adapted to instruct the SS to determine that a neighboring BS interference exists if the SS determines that the INR is larger than a predetermined threshold, and report interference information of the neighboring BS to the BS.

8. A method for identifying an interferential neighboring base station, BS, comprising:
   entering, by a BS, a back-off status during an occupied coexistence signaling interval, CSI;
   informing, by the BS, a subscriber station, SS, that reports an interference detection result or all SSs to identify an interferential neighboring BS after the BS enters the back-off status; and
   identifying, by the BS, the interferential neighboring BS by using an information reported by the SS;
   wherein the information comprises correctly-received broadcast message or an error information reported by the SS after the SS receives a broadcast message from the interferential neighboring BS during the CSI,
   wherein the BS entering the back-off status stops most of the coexistence signalling broadcast in the CSI intervals occupied by the BS,
   wherein the CSI is an interval during which the BS transmits energy signals and bears a coexistence signaling.

9. The method for identifying an interferential neighboring BS according to claim 8, wherein the broadcast message is a coexistence signaling broadcast message.

10. The method for identifying an interferential neighboring BS according to claim 8, wherein the BS enters the back-off status after receiving an interference status detecting report from the SS.

11. The method for identifying an interferential neighboring BS according to claim 8, wherein the SS reports the error information to the BS if no broadcast message is received within a set time period.

12. The method for identifying an interferential neighboring BS according to claim 8, further comprising:
   setting, by the BS, an identification time and terminating the back-off status if no broadcast message reported by the SS is received within the identification time.

13. A device for identifying an interferential neighboring base station, BS, comprising:
- a back-off status entering module, adapted to instruct a BS to enter a back-off status during an occupied coexistence signaling interval, CSI;
- an instruction identifying module, adapted to inform a subscriber station, SS, that reports an interference detection result or all SSs to identify an interferential neighboring BS after the BS enters the back-off status;
- a reporting module, adapted to instruct the SS to receive a broadcast message from the interferential neighboring BS during the CSI and report the correctly-received broadcast message or an error information to the BS; and
- an interferential neighboring BS identifying module, adapted to instruct the BS to identify the interferential neighboring BS according to the information reported by the SS,
- wherein the BS entering the back-off status stops most of the coexistence signalling broadcast in the CSI intervals occupied by the BS,
- wherein the CSI is an interval during which the BS transmits energy signals and bears a coexistence signalling.

14. The device for identifying an interferential neighboring BS according to claim 13, wherein the back-off status entering module is adapted to instruct the BS to enter the back-off status after the BS receives an interference status detecting report from the SS.

15. The device for identifying an interferential neighboring BS according to claim 13, wherein the reporting module is adapted to instruct the SS to report the error information to the BS if no broadcast message is received within a set time period.

16. The device for identifying an interferential neighboring BS according to claim 13, further comprising:
- an identification time period setting module, adapted to instruct the BS to set an identification time period, and terminate the back-off status if no broadcast message reported by the SS is received until the identification time period expires.

17. The method for detecting a neighboring BS interference according to claim 1, wherein the method is used to detect a neighboring BS interference under a License-Exempt frequency band.

18. The device for detecting a neighboring BS interference according to claim 6, wherein the device operates under a License-Exempt frequency band.

19. The method for identifying an interferential neighboring BS according to claim 8, wherein the method is used to identify the interferential neighboring BS under a License-Exempt frequency band.

20. The method for identifying an interferential neighboring BS according to claim 8, wherein the BS entering the back-off status stops most of the coexistence signalling broadcast in the CSI intervals occupied by the BS, and the BS continues to broadcast a coexistence signalling message in certain random intervals among the CSI intervals occupied by the BS.

21. The device for identifying an interferential neighboring BS according to claim 13, wherein the device operates under a License-Exempt frequency band.

22. The device for identifying an interferential neighboring BS according to claim 13, wherein the BS entering the back-off status stops most of the coexistence signalling broadcast in the CSI intervals occupied by the BS, and the BS continues to broadcast a coexistence signalling message in certain random intervals among the CSI intervals occupied by the BS.

23. A device for detecting a neighboring base station, BS, interference, comprising:
- a first unit configured to receive a coexistence signaling interval, CSI, information from a BS;
- a second unit configured to obtain a silent period in a CSI from the CSI information;
- a third unit configured to monitor an interference information from a neighboring BS during the silent period,
- wherein the silent period is a time period when the BS stops sending signals, or when sending energy of the BS is at a minimum level, or when sending energy of the BS has an energy symbol 0 during the CSI,
- wherein the CSI is an interval during which the BS transmits energy signals and bears a coexistence signalling.

24. The device for detecting a neighboring BS interference according to claim 23, further comprising:
- a fourth unit configured to report the monitored interference information to the BS.

25. The device for detecting a neighboring BS interference according to claim 23, wherein the CSI information includes CSI information occupied by the BS and a position of the silent period during the CSI.

26. The device for detecting a neighboring BS interference according to claim 23, wherein, the CSI information includes a content of a coexistence signaling message broadcasted by the BS during the CSI, and the coexistence signaling message includes at least one of an address of the BS, a proxy server address of the BS, and a BS identifier, BSID.

27. The device for detecting a neighboring BS interference according to claim 23, wherein the third unit further comprises:
- a first subunit configured to record noise power during the silent period;
- a second subunit configured to calculate an average noise power of the silent period by using the recorded noise power, subtract the average noise power from the recorded noise power to obtain a result, and divide the result by the average noise power to obtain an interference-to-noise ratio, INR;
- a third subunit configured to determine that the neighboring BS interference exists if the INR is larger than a predetermined threshold; and
- a fourth subunit configured to report interference information of the neighboring BS to the BS.

28. The device for detecting a neighboring BS interference according to claim 23, wherein the device operates under a License-Exempt frequency band.

29. A device for identifying an interferential neighboring base station, BS, in a base station, BS, comprising:
- a first unit configured to instruct the BS to enter a back-off status during an occupied coexistence signaling interval, CSI;
- a second unit configured to inform a subscriber station, SS, that reports an interference detection result, or to inform all SSs to identify an interferential neighboring BS after the BS enters the back-off status; and
- a third unit configured to identify the interferential neighboring BS by using information reported by the SS;
- wherein the information comprises a correctly-received broadcast message, or error information reported by the SS after the SS receives a broadcast message from the interferential neighboring BS during the CSI, and
- wherein the BS entering the back-off status stops most of the coexistence signalling broadcast in the CSI intervals occupied by the BS,
- wherein the CSI is an interval during which the BS transmits energy signals and bears a coexistence signalling.

30. The device for identifying an interferential neighboring base station, BS, in a base station, BS, according to claim 29, wherein the broadcast message is a coexistence signaling broadcast message.

31. The device for identifying an interferential neighboring base station, BS, in a base station, BS, according to claim 29, wherein the BS enters the back-off status after receiving an interference status detecting report from the SS.

32. The device for identifying an interferential neighboring base station, BS, in a base station, BS, according to claim 29, wherein the SS reports the error information to the BS if no broadcast message is received within a set time period.

33. The device for identifying an interferential neighboring base station, BS, in a base station, BS, according to claim 29, further comprising:

a fourth unit configured to set an identification time and terminate the back-off status if no broadcast message reported by the SS is received within the identification time.

34. The device for identifying an interferential neighboring base station, BS, in a base station, BS, according to claim 29, wherein the device operates under a License-Exempt frequency band.

35. The device for identifying an interferential neighboring base station, BS, in a base station, BS, according to claim 29, wherein the BS entering the back-off status stops most of the coexistence signalling broadcast in the CSI intervals occupied by the BS, and the BS continues to broadcast a coexistence signalling message in certain random intervals among the CSI intervals occupied by the BS.

* * * * *